United States Patent [19]

Parks

[11] Patent Number: 4,821,023
[45] Date of Patent: Apr. 11, 1989

[54] WALK-THROUGH METAL DETECTOR

[75] Inventor: Stephen I. Parks, Derwood, Md.

[73] Assignee: Del Norte Technology, Inc., Euless, Tex.

[21] Appl. No.: 141,706

[22] Filed: Jan. 7, 1988

[51] Int. Cl.⁴ .................... G08B 13/24; G08B 13/14; G08B 29/00
[52] U.S. Cl. .................................. 340/551; 340/516; 340/572
[58] Field of Search ................... 340/551, 572, 825.57, 340/514–516; 324/260, 243

[56] References Cited

U.S. PATENT DOCUMENTS

| | | | |
|---|---|---|---|
| 2,179,240 | 11/1939 | Breitenstein | 340/568 |
| 3,676,772 | 7/1972 | Lee | 324/233 |
| 3,686,564 | 8/1972 | Mallick, Jr. et al. | 324/232 |
| 3,697,972 | 10/1972 | Brown | 324/243 X |
| 3,697,996 | 10/1972 | Elder et al. | 324/260 |
| 3,758,849 | 9/1973 | Susman et al. | 324/243 X |
| 3,950,696 | 4/1976 | Miller et al. | 324/234 |
| 3,971,983 | 7/1976 | Jaquet | 324/227 |
| 4,012,690 | 3/1977 | Heytow | 324/243 |
| 4,309,697 | 1/1982 | Weaver | 340/572 |
| 4,354,178 | 10/1982 | Janssen | 340/572 |
| 4,484,183 | 11/1984 | Morey | 340/568 |

FOREIGN PATENT DOCUMENTS 81-1227 11/1981 Italy .
82-1208 3/1982 Italy .

OTHER PUBLICATIONS

King, "Theory of Modulated Scatters", *Homodyne Systems*, pp. 178–216.

Primary Examiner—Glen R. Swann, III
Assistant Examiner—Thomas J. Mullen, Jr.
Attorney, Agent, or Firm—Louis Bernat

[57] ABSTRACT

A pulsed-field walk-through metal detector contains circuitry to reduce several different types of external noise, or interference due to external stationary or moving metal, and signals due to small objects, such as jewelry. A self-test fixture monitors system performance. The detector has digitally controlled timing means operated at an odd half-multiple of the power mains frequency. A gated integrator is active for periods equal to a multiple of the TV retrace frequency. A switched-capacitor FIR filter removes signals due to steady power line hum, and a subtractive means removes signals due to stationary metal, prior to averaging or low-pass filtering. A peak limiter controls transient noise bursts. A voting circuit reduces the likelihood of false alarm triggering. A simple self-test circuit, consisting of a wire loop and a switch, tests the entire signal path and has no moving parts.

17 Claims, 9 Drawing Sheets

BLOCK DIAGRAM OF THE METAL DETECTOR SYSTEM

A CONCEPTUAL PULSED METAL DETECTOR

FIG. 9

TIME SEQUENCING OF PROCESSES FOR METAL DETECTOR SYSTEM

SIGNAL PREPROCESSING IN THE METAL DETECTOR SYSTEM

FIG.10

HUM AND TRANSIENT REMOVAL 260

FIG. 11

DEMODULATOR 270

FIG. 12

SHOWING LOWPASS FILTER 290, VOTING COMPARATORS 300 AND STATIC METAL INTEGRATOR 310

WALK-THROUGH METAL DETECTOR

This invention relates to pulsed-field metal detectors of the type that may, for example, be used to detect contraband metal concealed on persons entering or leaving secure areas. Exemplary installations include air terminals, prisons, and jewelry factories.

The detection of metal by electromagnetic methods dates at least from as early as World War I, when buried mines and the like were found by illuminating a region near the surface of the earth with an electromagnetic flux as the surroundings were searched with a receiving antenna or coil probe. Anomalous zones containing a metal would produce a distinctive signal. The distinguishing characteristic which these probes detected was a difference in a response from a receiving apparatus when the coil probe encountered a change in the complex magnetic reluctance of a specific volume, as compared to the typical value for that area.

Later, investigators such as Wait (U.S. Pat. No. 2,735,980) taught how to use the phenomena in order to prospect for mineral-bearing ores. MacNae, et al, "Noise Processing Techniques for Time-Domain EM Systems" in GEOPHYSICS Magazine, a publication of The Society of Exploration Geophysicists, Tulsa, Okla., July 1984, discusses several aspects of modern processing as practiced in mineral exploration.

Barringer (U.S. Pat. No. 3,430,221) taught how to detect the presence of an object such as an automobile in a location such as a traffic intersection. Barringer illuminated the ferrous parts of an auto and recorded the presence or passage of a vehicle by inspecting the illuminated area with a pulsed-field system. The received signal changed in response to the presence (or absence) of ferrous metal in or around a loop of wire. Miller (U.S. Pat. No. 3,707,672) teaches how to distinguish ferrous material.

These methods of metal detection have been put to use at inspection stations in places such as entrances to airports, courtrooms, nuclear plant facilities, and other secure areas. Metal detectors of this type usually have upright portals which form a gate space that is large enough for people to walk through. The portals include coil antennas which are often enclosed in side panels. The metal detectors are usually designed and adjusted so that signals which are the signature of gunmetal are preferred over signals from other, usually innocent, materials.

The characteristic which has been found most useful in such metal detectors involves a change in a voltage induced at a receive coil during the collapse of a magnetic excitation field within the detected metal. This kind of metal detector may be thought of as a balanced electronic bridge formed by two lossy transformers, where the coupling from the primary excitation winding to the secondary receiver winding of one of the transformers is altered by the presence of a metal object. The imbalance signal is then sensed and processed.

The coupling of the two transformer windings via a metal object is not typically instantaneous; there are delays in the response time due to eddy currents and other dissipative phenomena in the metal object. Most pulsed-field metal detectors observe these delayed responses by integrating the voltage induced in the receive coil as a function of time following removal of the excitation field. The dependence of the result so obtained on the timing of the integration period may then be used to infer the type and amount of metal in the field of the detector. As described by Miller, the response from iron has a peculiarly slow nonexponential waveform corresponding to the slow collapse of the internal magnetization when an external field is removed. For a full discussion of integration, gated integration and weighted integration, see the Appendix to the specification.

Using a time response characteristic, metal detectors have been made to differentiate between small nonferrous objects and objects made of iron or steel. The time constants of the nonferrous objects range from 20 to 200 microseconds. The longer signals from steel may exhibit decays lasting up to a millisecond. One way to favor detection of steel is to delay the onset of an integration of a signal produced by the response characteristic for a certain fixed time following the end of the excitation signal. Miller has described a way of further increasing the differentiation by preceding the main integration with another integration, the objective being to extract a signature from this two-point time sample by what amounts to a ratiometric technique. In the inventive system we describe a new differentiation technique that is highly effective in discriminating between ferrous and nonferrous material.

The design of walk-through metal detectors demands attention to a number of practical requirements. For example, to be useful the detector must be sufficiently sensitive, detecting nearly all contraband objects. It must exhibit good discrimination so that a guard's attention is not frequently distracted to examine small innocuous objects found by the detector. The detector must enable a high throughput, permitting a reasonably high traffic rate at normal walking speed. It must be immune to bombardment by interference signals of various sorts which could otherwise reduce the sensitivity of the instrument or cause false alarms.

In order to provide a perspective on the interference problem, interference sources commonly encountered by metal detectors are displayed in Table 1. The "processing approach" of each source is given in parentheses to indicate the approach used in dealing with the interference. The terms used in this table will be elaborated and explained later in the specification. Notice that some of the interference signals are not "noise" in the traditional sense, but result from the system's response to an irrelevant moving metal object. In the following discussions, the term "noise" refers to externally generated signals, while "interference" includes both noise and irrelevant metal signals.

Processing approaches:

(1) Steady signals which are almost synchronous with the power line may be eliminated by maintaining observation timing in synchronization with the power line. The measurements may then be conducted so that these interference signals are cancelled by linear combination.

(2) High frequency oscillatory signals are attenuated by using frequency domain processing techniques such as lowpass or comb filtering.

(3) Some noise signals have no usable signature, so that the system is easily jammed by relatively low level signals. A way to deal with this type of interference is to prevent signal entry by appropriate coil design, placement, and shielding.

(4) Widely spaced transients are reduced by time domain processing, using limiting, averaging, and rejection of noisy ensembles.

(5) These signals produce a constant offset value. Use adaptive correction or AC coupling to remove the signal.

(6) Signals from external moving metal are indistinguishable from internal signals. If the position of a moving object can be measured or predicted, map the interference caused by the motion and subtract it from the gross receiver output signal in order to compensate for the motion.

(7) Light metal signals may frequently be distinguished from gunmetal by their shorter decay times or other properties.

TABLE 1

TYPES OF INTERFERENCE ENCOUNTERED BY METAL DETECTORS

| INTERFERENCE SOURCE AND (PROCESSING APPROACH) | AMPLITUDE RELATIVE TO THE AMPLITUDE PRODUCED BY A PISTOL | TIME DOMAIN PROPERTIES |
|---|---|---|
| Power Line Fields from conduits, fluorescent lamps, ground faults, etc. (1, 4) | 200 | Occasional abrupt step changes but constant waveform between steps. |
| TV Horizontal Drive (2) | 400 | Precise and steady near 15 KHz. |
| TV Vertical Drive (1) | 400 | Precise and steady near power frequency. |
| Brush Motor Noise (3) | 20 | Random but seldom encountered. |
| SCR Activity (4) . . . Heaters | 200 | Roughly line-synchronous with fast and unpredictable phase shifts. |
| Forklifts and (3, 4) Wheelchairs | 100 | 10 to 1000 Hz irregular spikes. |
| Switch Closures (4) | 200 | Singular spikes. |
| Sferics . . . Lightning (4) | any | Very rare singular spikes. |
| Stationary metal (5) | 800 | Always there. |
| Moving external metal . . . Doors, Elevators, Briefcases (3, 6) | 100 | Detectors are usually located away from these objects. |
| Innocuous carried metal objects (3, 7) | 4 | Signal decay properties may contain telltale signature. |

Over the past decade, considerable progress has been made in dealing with such interference, but there is a demand for still more improvement. In practice, false alarms due to interference are still major sources of irritation and delay in security screening areas.

Accordingly, an object of the invention is to provide new and improved means for and methods of detecting contraband metal within the gate area. In this connection, an object is to provide a means for reducing interference caused by factors other than contraband metal.

In keeping with an aspect of the invention, these and other objects are accomplished by a metal detector system having a portal or gate volume dominated by transmit and receive coils. The transmit coil illuminates the gate volume with a pulsed magnetic field. At the end of each pulse, the receive coil picks up signals resulting from a collapsing magnetic field within metal objects in the gate area. These signals are processed in such a way as to extract and respond to signals from contraband metal, while ignoring interference.

The preferred embodiment of the invention is shown in the attached drawings, in which.

Figure 1:
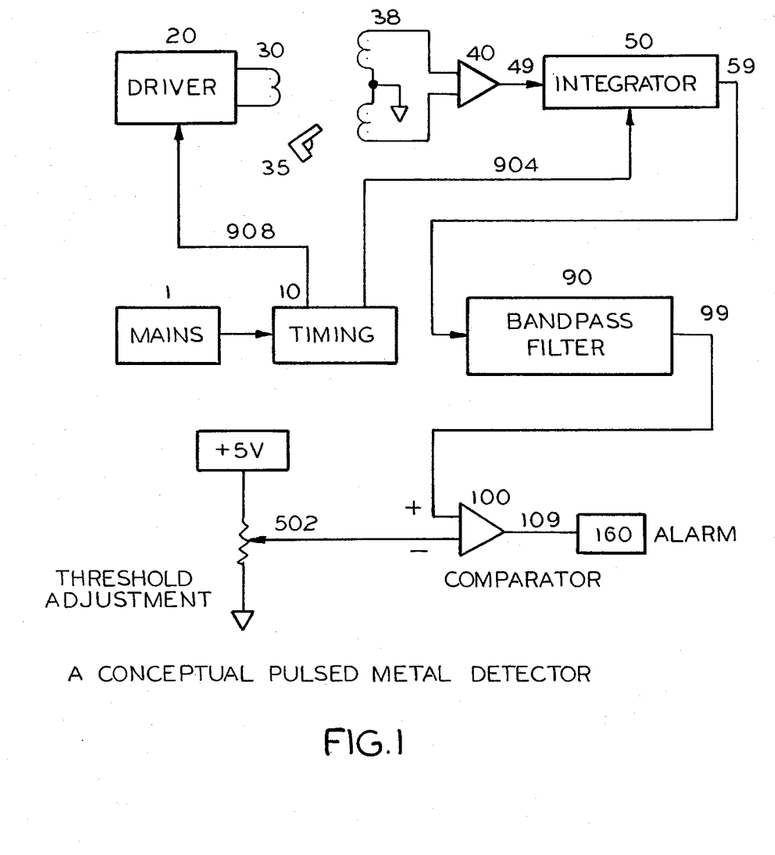
FIG. 1 depicts a conceptual pulsed-field metal detector.

Consider a pulsed metal detector of a simple type, as shown in FIG. 1. The power mains 1 are coupled into a multiplier 10 which supplies timing synchronization at an integer multiple (three, for example) of the power line frequency. Nearly rectangular current pulses are applied through driver 20 at this rate to the excitation coil 30. Following each current pulse, the signals induced in the receive coils 38 by decay of magnetism in object 35, are amplified at 40 and integrated at 50 to yield a series of samples at the output 59 of the integrator 50. Six such samples are displayed in FIG. 2A. The six samples, labeled (ABC) and (DEF), are acquired during two successive cycles of the AC power mains. These samples are passed through an analog bandpass filter 90 (FIG. 1) to remove unwanted frequency components. The remaining signal is compared at comparator 100 against a preset threshold 502. If the signal exceeds that threshold level, an alarm signal 109 is given.

Figure 2:
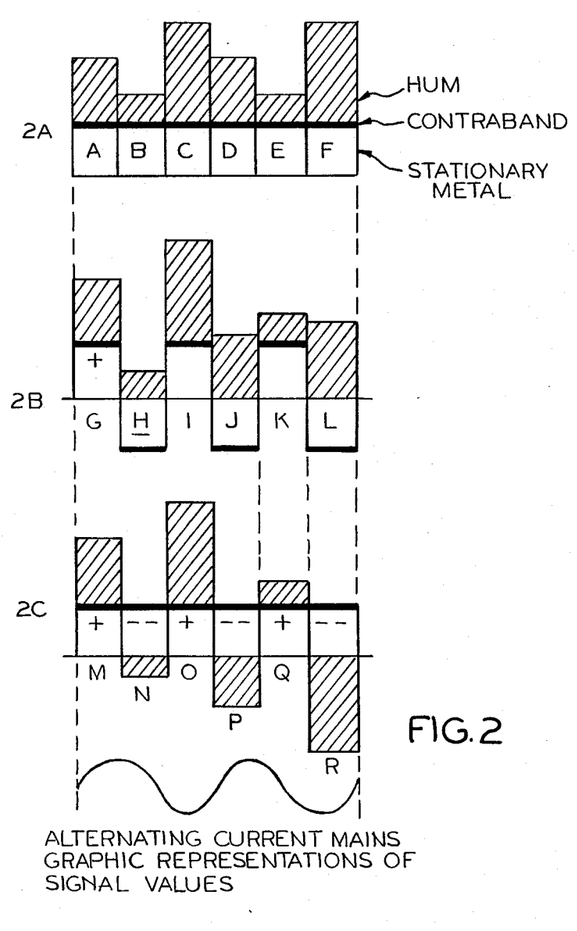
FIGS. 2A-2C provide graphical representations of signal sample values.

Two forms of interference signal which are always present in a walk-through metal detector are hum from the power mains, containing 60 Hz and its harmonics, and strong signals due to stationary metal in and around the detector coil array. FIG. 2 explains how these interferences are reduced. The interference components of each sample are shaded differently. The component due to hum is diagonally hatched. The component due to stationary metal is open and unshaded. The small potential signal due to a weapon is solid. Notice the relative magnitudes of these signals, which are typical for a metal detector. Clearly, until the stationary metal signal and the hum signals have been removed, the signal processor needs to have a wide dynamic range capability in order to represent the signal.

A weapon, carried through a metal detector, will produce a slowly varying amount of signal. Passing the signal through a bandpass filter eliminates the rapid cyclic signal due to AC power, and the steady (DC) signal due to static metal. After bandpass filtering, the remaining signal is the weapon signal.

This simple approach is subject to severe interference due to changes in line voltage, phase or wave shape. Even though the time-average hum signal at the sensor coil is zero, the average of the hum samples in FIG. 2 is not usually zero. This phenomenon, called "aliasing", is well known. For example, in FIG. 2 all the hum components of the samples are represented as a positive value for clarity. Actually, this uniformity of polarity would be unlikely but not impossible. A change of the hum signal would translate into a change in the average value (DC component) of the sampled hum. This change in average value would likely pass through the bandpass filter and simulate a "carried weapons" signal, probably causing an alarm.

A common means for addressing this problem is to pulse and observe at an odd-integer multiple (three, for example) of the power frequency, while inverting the excitation in coil 30 on alternate pulses. A representative series of samples, resulting from such an excitation pattern, is shown in FIG. 2B. The hum signals appear at the receiver input in the same sense as before, while the metal signals are alternately inverted. FIG. 2C shows the result when alternate samples are inverted within the receiver. Samples N,P, and R follow inverted stimulus pulses and have been inverted in the receiver. This double inversion is represented in FIG. 2C by a double hyphen(--). The metal signals always appear on the output in the same sense. On the other hand, since the hum signals are inverted only once, if ever, by the receiver, any contribution due to hum is balanced three samples later by an equal and inverted sample. For example, the hum component of M (FIG. 2C) is cancelled by the hum component of P, which is equal and inverted. Consequently, any sum of 6×N adjacent samples, where N is any positive integer, contains the sum of all metal signals, but substantially no contribution due to steady hum.

Figure 4:
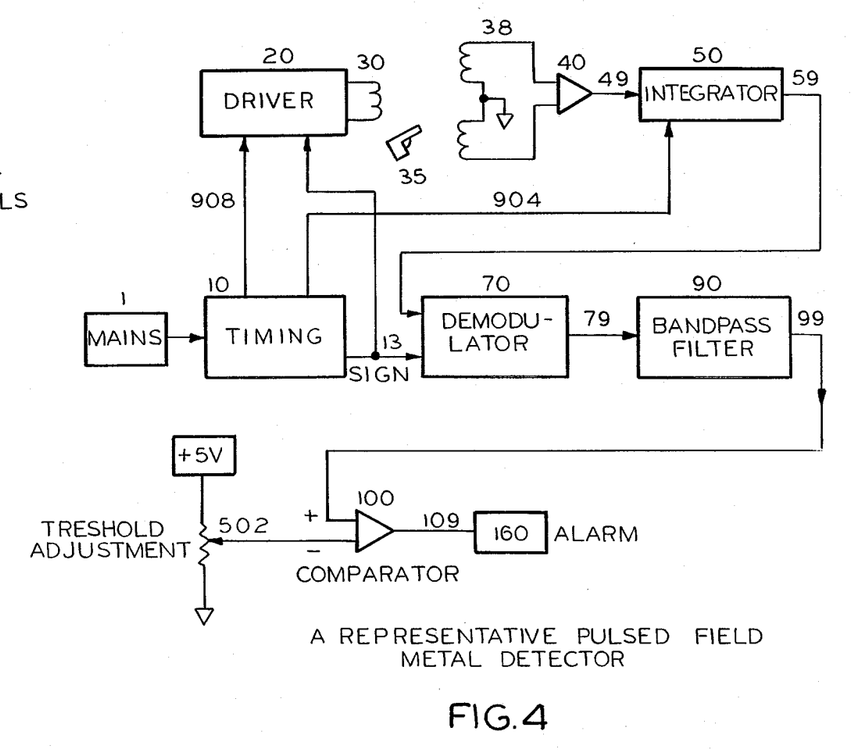
FIG. 4 depicts a prior art pulsed-field metal detector.

FIG. 4 shows an electronic system similar to the system of FIG. 1 which contains additional elements to accomplish the inversions described above. The timing system provides a control signal 13 which changes sign before each pulse. It controls the direction of the current provided by the driver 20. The signals induced in contraband object 35 now alternate in sign from sample to sample. The signals are picked up by the receive coils 38 and are processed as in FIG. 1 by amplifier 40 and integrator 50. The second signal inversion takes place in the receiver's demodulator 70 which inverts the integrator output signal under control of the same signal 13 that controls drive inversion. The signals 79 from the demodulator are represented in FIG. 2C.

In some metal detector systems, the summation process is approximated by using a lowpass filter at 90 (FIG. 4) to average the samples. In frequency domain terms, we may say that a sampling process has aliased the hum signal to odd half-multiples of the power frequency, which are then blocked by lowpass filtering.

The picture is different if the hum level changes abruptly. For example, a transient may be present, as at sample E of FIG. 3A. This transient, averaged into the 6N-sample ensemble, produces a signal output that can be large enough to cause an alarm. The word ensemble is used in this specification to refer to a selected number of signal samples, resulting from an unbroken series of signal observations.

Similarly, a change in hum level or waveform in the middle of the 6N-sample ensemble may disrupt the sum as a singular transient would disrupt it. Transients due to step changes in hum may also be considered in the frequency domain, where they produce sidebands having amplitudes expressed by the equation $$S(f) = A0/(f-f0)$$

where:
S(f) is the signal amplitude at frequency f,
A0 is proportional to the amplitude of the step change, and
f0 is the fundamental frequency of the hum.

Phase-alternate sampling at three times the power frequency, as described above, converts the receiver hum interference signal to half the power frequency. If the hum amplitude step is sufficiently large, sideband power, now centered at 30 Hz, can spill into the passband of the 10-Hz filter and cause an alarm. Such stepped power line transients are a major cause of external noise in metal detector installations.

Another major disturbance to metal detector operation is a signal due to stationary metal. Stationary metal has three effects on a metal detector. It can introduce large offset levels at the input sampling integrator which tax the dynamic range of the metal detector. Second, it can distort the field pattern of the excitation or receive coils, causing variations in sensitivity as a function of the placement of the detector. Third, it can distort spatially uniform hum and interference fields into highly curved local patterns, in part defeating the built-in ability of most modern metal detector receiver coil arrays to ignore uniform fields.

The second and third effects are important, but are not within the control of the receiver electronics described in this patent application, and are dealt with in the co-pending application, Ser. No. 142,632 filed Jan. 11, 1988. Briefly, a good sensor array design will anticipate the most common types of large metal object, such as doors, X-ray machines, floor reinforcements and ceiling fixtures, and attempt to reduce the consequences of their presence by assuring a low sensitivity to field geometries characteristic of such objects.

The first effect, the offset levels, is dealt with in several ways in prior art. These approaches are enumerated below:

1. Use of orthogonal symmetry relationships between excitation and receive coils minimizes both direct coupling between excitation and receiver, and also coupling via large metal objects. For the purposes of this disclosure, the transmitter coil array is orthogonal to a receiver array if the two are closely spaced but arranged geometrically and connected electronically, so that no net voltage is induced in the receiver array during a current change in the transmitter array. Here we refer to the operation of integration over space, of the fields of the excitation and receive coils, if both coils are concentric in the same plane.

2. External shielding stabilizes the field patterns (usually maintaining orthogonality) and masks off the effects of external objects.

3. Additional metal may be applied and custom-adjusted in such a way as to offset coupling to large external objects (Heytow, U.S. Pat. No. 4,012,690).

4. Highpass filtering of the metal signal, or the equivalent, is used to cause the system to ignore unchanging offset levels. As usually implemented, this involves a tradeoff between detecting small weapons being carried slowly (sensitivity to low frequencies is required) and recovering quickly from large transients (requiring a higher cutoff.)

Following application of these precautions and processes, the dominant signal should be due to contraband metal carried through the detector. The bandpass filtered signal is compared against a threshold level. Excursions beyond that level are interpreted as contraband. Typically, an audible alarm is issued upon detection of such a threshold crossing.

Important features of this invention include the following:

I. Novel means of preprocessing the received signal, by linearly stripping high amplitude predictable signals from the input prior to limiting or averaging. Two such signals are so stripped: hum and static metal.

II. Using precise timing in the signal-integration circuit to minimize sensitivity to high frequency oscillatory signals.

III. Imposing a requirement that a signal be consistently beyond a threshold for a minimum time before an alarm is issued. This differs from lowpass filtering in that large but brief excursions do not affect the alarm output.

IV. A self-testing system which has no moving parts yet closely simulates a moving metal object. This enables a thorough automatic self-test.

V. A means for anticipating and allowing for signals due to moving metal objects, such as doors, near the detector, thus permitting uninterrupted sensitivity even when a door is in motion.

VI. A new integration process provides excellent discrimination between typical pocket clutter and steel weapons such as firearms and knives.

Figure 5:
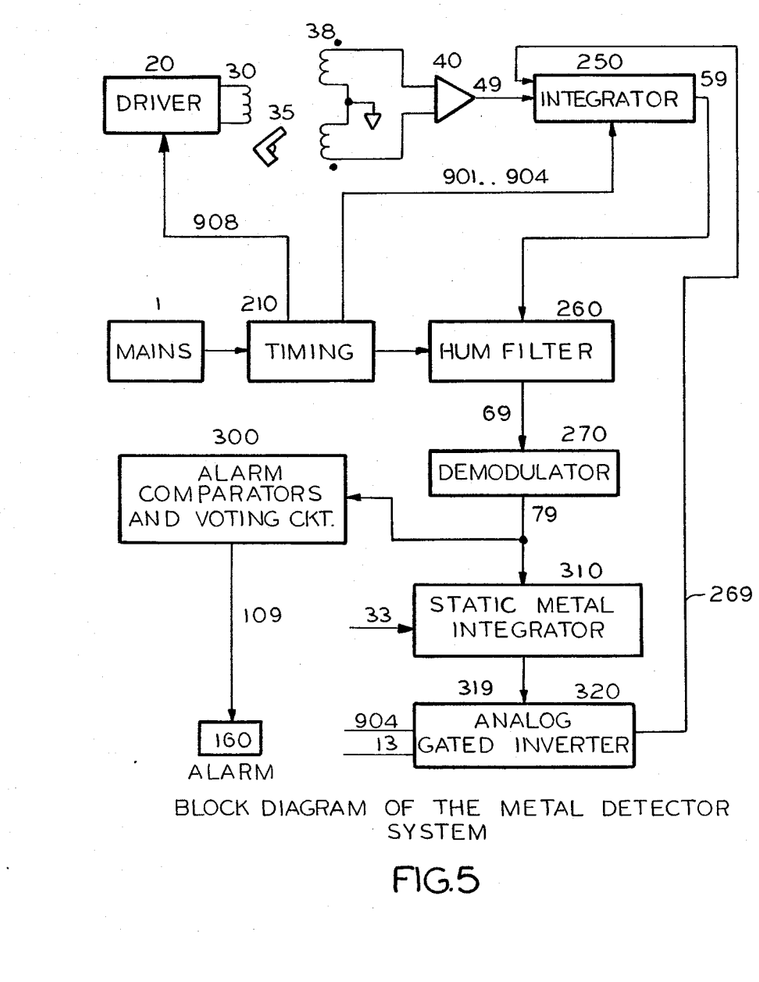
FIG. 5 is a block diagram of the metal detector system.
Figure 8:
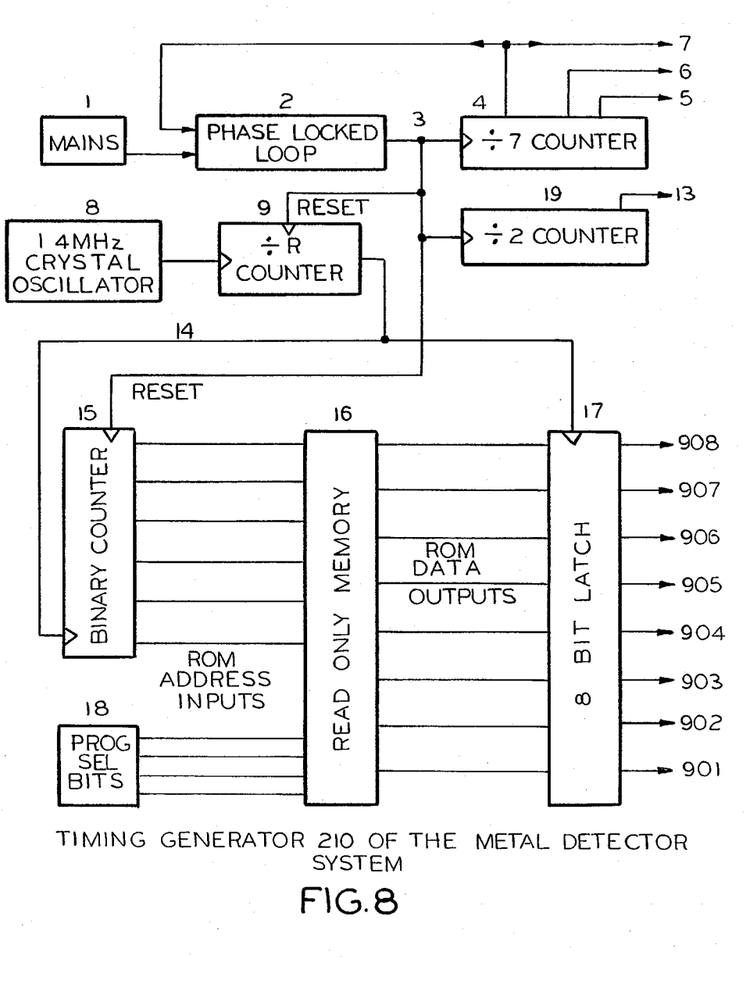
FIG. 8 is a block diagram of the timing section of the inventive system.
Figure 9:
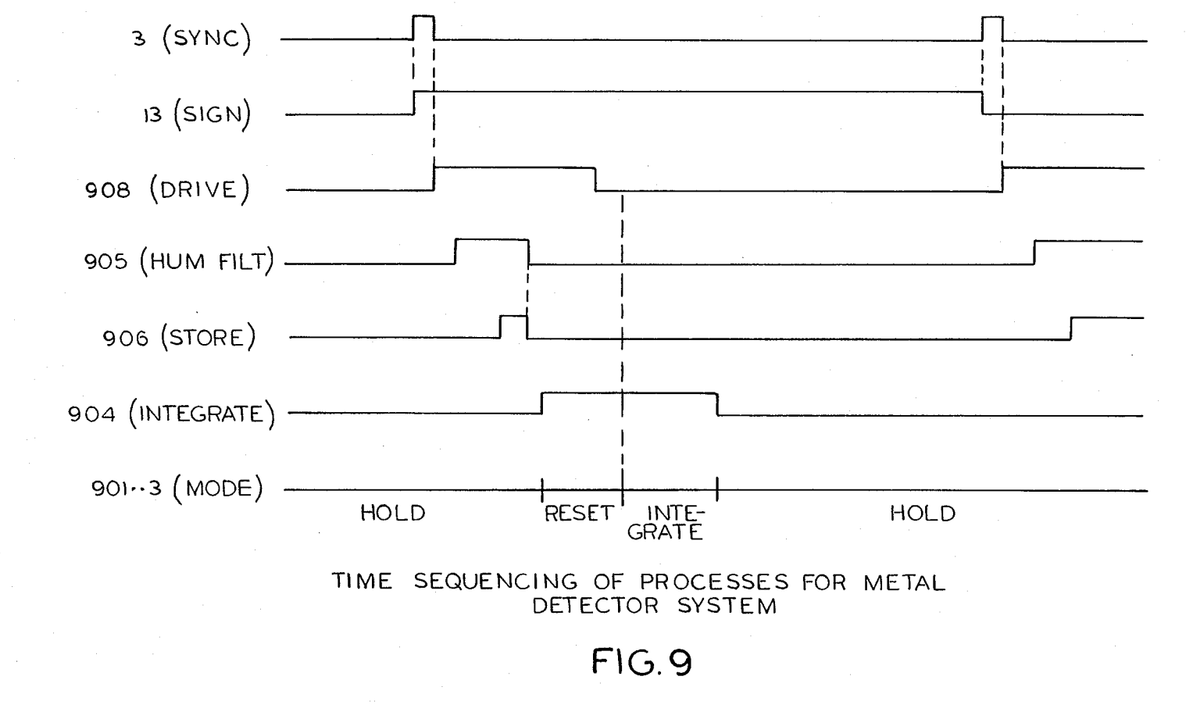
FIG. 9 graphically shows the time sequencing of processes in the inventive system.

FIG. 5 is a block diagram of the invention. The metal detector has a timing means 210. The timing means is synchronized to the operating frequency of the power mains 1 at an integer multiple of the power frequency. The timing means causes the driver means 20 to apply pulses of current to excitation coil 30 at the multiple frequency. These pulses have alternating direction. Signals from contraband object 3 responsive to changes in current at transmit coil 30 cause voltages to be induced in receive coils 38. These signals are amplified by 40 and passed on to a gated resettable integrator 250. The reset and integration timing are under control of logic signals 901–904 provided by the timing means 210, as described in more detail in FIG. 8. FIG. 9 shows the relative timing of signals from the timer of FIG. 8. Another signal 269 is input to the integrator from the static metal compensation circuit. Hum from the power mains is removed by a filtering means 260 as described in FIG. 11. Transients are limited by diodes 263 in FIG. 11. The reverses of signal direction due to reversals of the drive signal at coil 30 are removed in demodulator 270 of FIG. 12. The output of the demodulation circuit is filtered by components 291 through 295 of FIG. 13 and then applied to comparator and voting circuit 300 of FIG. 5, where a decision is made whether contraband metal is present. If it is present, an alarm 160 is activated. The demodulator output 79 is integrated by static metal integrator 310 of FIG. 5. The integrator output 319 of FIG. 13 is conditioned by an analog gated inverter 320 of FIG. 10. The resulting signal 269 is fed back to the input of integrator 250.

The timing section 210 controls both the excitation timing signal 908 and the flow of data through the system. The timing plays an important supportive role in the invention. A schematic of one implementation of the timing section is shown in FIG. 8.

Figure 7:
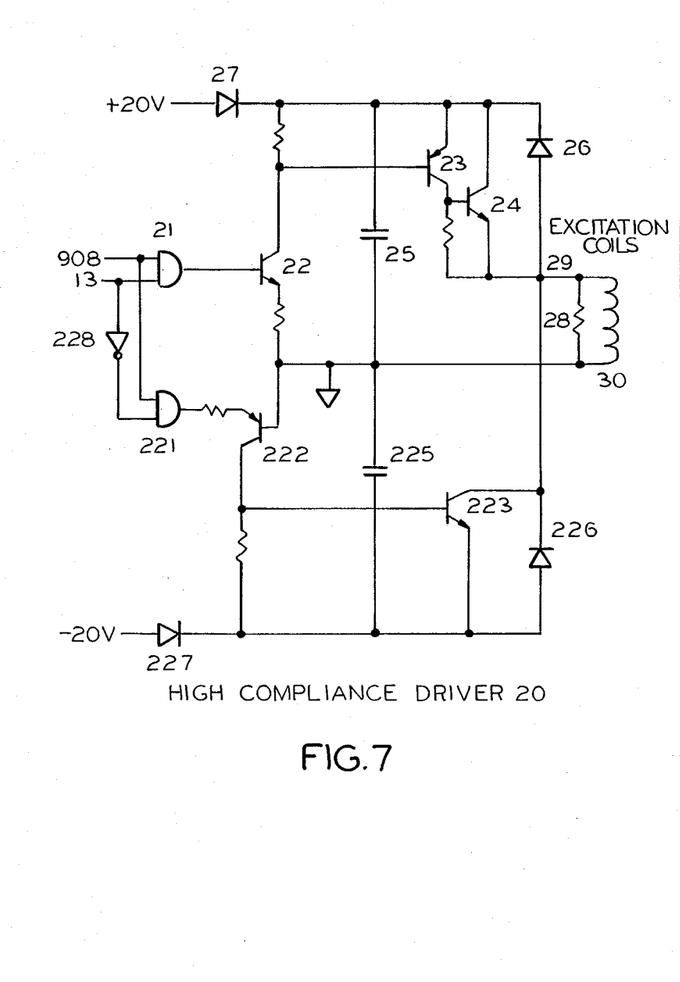
FIG. 7 is a schematic circuit which shows a reversible high compliance driver for metal detector excitation coils.

The driver 20 of FIG. 5 is of conventional design. One example is shown in FIG. 7. It has a high voltage compliance and generates approximately rectangular current pulses having alternating current direction on each successive pulse. Pulses are separated by receiving intervals with no excitation.

On the other side of the detector gate are receive coils 38 FIG. 5. Imbalance signals in the receive coils due to carried metal objects, as well as interference signals, are amplified by preamplifier 40 prior to processing.

Figure 10:
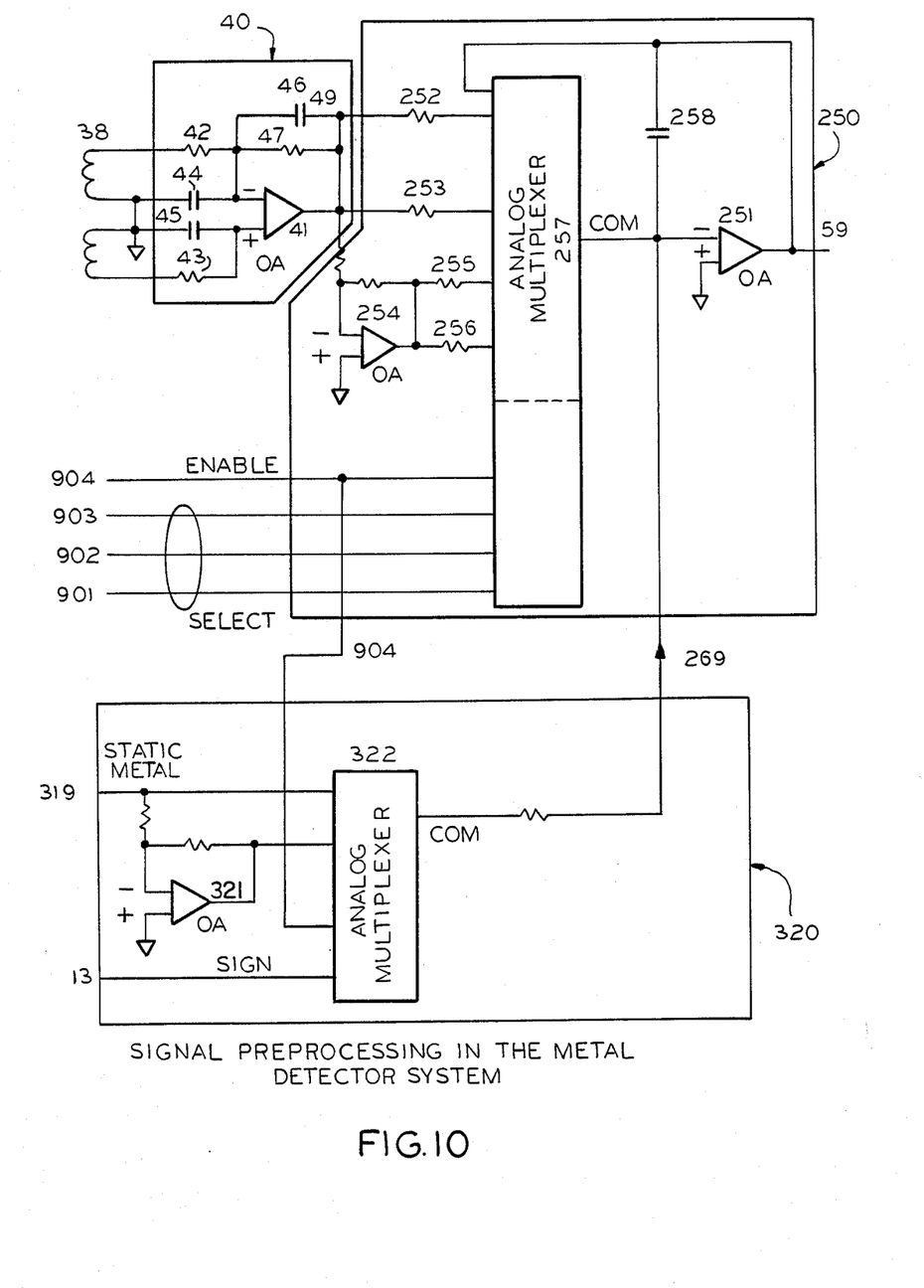
FIG. 10 shows the signal preprocessing section of the inventive system.

The input preamplifier 40 provides a controlled differential gain and bandwidth. Sampling integrator 250 is capable of positive or negative weighted integration. The exact timing of the integration is very important. The static-metal compensation is most easily implemented by applying a second input 269 to the integrator. A differential amplifier circuit capable of performing this task is shown in FIG. 10.

Signal power at the integrator input 49 of FIG. 5 is dominated by two extraneous sources. The first, which is called a static metal signal, is due to a leakage of excitation signals into the receive coils. Such leakage includes direct coupling from excitation to receive coils due to coil irregularities and indirect coupling through static metallic objects in regions where the transmit and receive coil fields overlap.

A compensating signal, provided by integrator 310 and gated inverter 320, is subtracted from the processed signal at the input of operational amplifier 251. The end effect is to remove the static metal signal from the output 9 of integrator 250.

Figure 11:
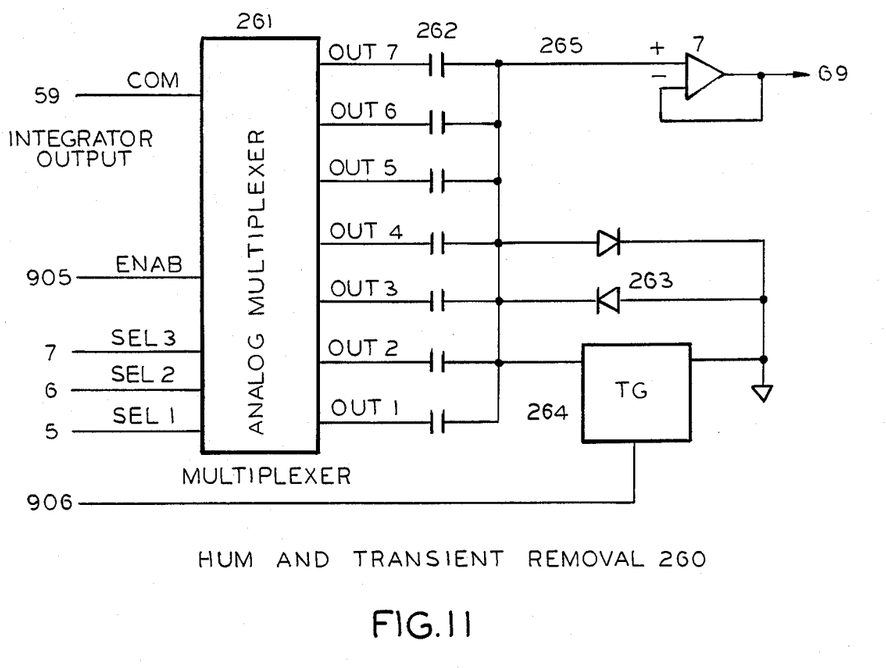
FIG. 11 is a block diagram which shows the portion of the invention that removes hum and transients.

The second major interference, power-line hum, is substantially removed by a finite-impulse-response comb notch filter 260 titled "Hum and Transient Removal" in the schematic of FIG. 11.

Figure 3:
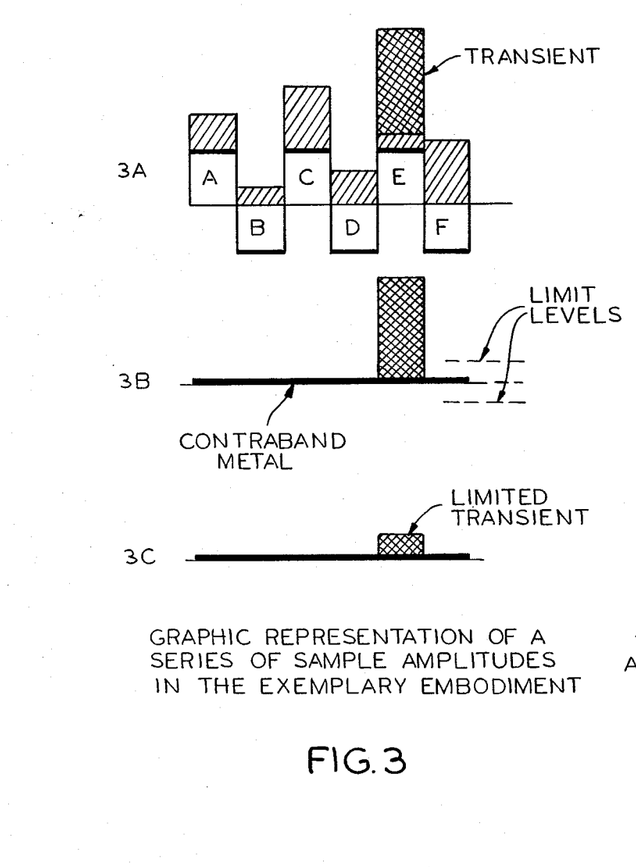
FIGS. 3A-3C are graphical representations of a series of sample amplitudes from the metal detector system.

By this time the signal is as represented in FIG. 3B. Transients are exposed as signals which are much greater than metal signals and therefore may be limited by silicon diodes 263 (FIG. 11). The result, FIG. 3C, has a substantially reduced transient signal.

The receiver inverts the samples marked "--" in FIG. 2C. In the inventive system, this inversion takes place in the demodulator 270 (FIG. 5). Such a demodulator is shown in detail in FIG. 12. A lowpass filter 290 of FIG. 13 reduces random noise somewhat. Then, the signal goes to a voting comparator 300 where the signal must be consistently beyond the alarm threshold for a certain number of time periods, regardless of amplitude, before an alarm is issued.

DETAILED DESCRIPTION OF THE INVENTION

All timing in the inventive system is derived from the timing circuit depicted in FIG. 8. The AC signal 1 from the power mains is coupled to the "reference frequency" input of a phase-locked-loop integrated circuit 2 such as a CD4046 made by RCA. The output 3 of the circuit drives a binary coded divide-by-seven counter 4, which may be a 74HC161 counter. The divided output 7 is fed back into the "controlled frequency" input of phase locked loop 2. The output frequency at 3 converges to a frequency which is equal to seven times the power mains frequency. This signal is used to synchronize the sequencing of all excitation and signal processing in the inventive system. The 7x-frequency (420 Hz in the U.S.A. or 350 Hz in Europe) is used to reset a digital counting cascade of divide-by-R counter 9 and a binary counter 15 every 1/420th second. Counter 9 is driven by a crystal oscillator 8 operating at approximately 14.3 MHz. Any other crystal frequency may be used so long as the division ratio R in programmable divider 9 is adjusted so as to produce the desired time base at the output 14. The binary counter 15 produces an output word which increments at 63.5 microsecond intervals.

The output of this binary counting cascade is decoded in a programmable read-only memory 16. The output of the memory is latched by an 8-bit D-type digital latch 17. The timing pattern of the outputs 901–908 depends on a sampling program which is for a particular task. Up to thirty seven increments of 63.5 microseconds are available, each of which may be assigned as part of the cycle before a reset occurs. A new sampling sequence starts when the reset recurs. Several different timing patterns may be simultaneously stored in the memory and selected by means of program selection bits at 18.

The 7-frequency 3 is divided by two at divider 19 of FIG. 8, in order to produce an odd-even cyclic (sign) command signal to determine the polarity of the drive to the excitation coil 30 This means that if current pulse number 0 is positive, then all even-numbered pulses are positive and all odd-numbered pulses are negative. With the repetition rate at 420 Hz, half of the pulses, such as the even ones, energize the transmit coil 30 in one sense (e.g., positive), at a rate of 210 samples per second in the exemplary system. The intervening pulses, the odd ones in this example, excite the space in the gate or portal in a negative sense. The response of the metal object 35 (FIG. 5) reverses sense to follow the excitation.

REMOVAL OF TV HORIZONTAL DRIVE SIGNALS

Horizontal drive signals are radiated from closed circuit TV monitors and broadcast TV sets. They have in common, the horizontal retrace frequency is almost always the same in a given nation. The frequency is very tightly controlled by the electronics or camera originating the video image. In the U.S.A. the most common frequency is 15.750 KHz. Integration over an integer number of cycles of any AC signal will produce a null integral, regardless of the point in phase where the integration begins and ends, and regardless of the shape of the waveform. Because of these two facts, it is advantageous to set the interval between the incrementing of the timing address counter at exactly the standard horizontal retrace frequency which may be encountered by the system. As long as the integration periods implemented by the timing system incorporate an integer number of timing steps, the integration encompasses a precise integer number of horizontal retrace cycles. Therefore, TV horizontal retrace signals are eliminated without requiring special filters, synchronization, or the like. It is also possible to set the time base to supply an integer multiple K of the interference frequency, and hold the integrator controls constant for an integer multiple of K counts to achieve the same effect.

The time base may be changed in order to cancel other highly periodic and stable noise sources, including video displays employing other timing standards, switching power supplies, and very-low-frequency radio transmitters. The range of interference frequencies over which this technique can be conveniently and advantageously applied in pulsed metal detectors includes 2 KHz to 100 KHz. In order to achieve 10 dB of increased rejection of the interference signal, the integration interval should not deviate from an integer multiple of the interference signal period by more than 0.05 times the interference signal period. Rejection improves as one reduces this difference. The integration interval in the exemplary case is an integral multiple of 63.5 microseconds from divider 9 of FIG. 8. The horizontal retrace rate of 15.750 has a period of 63.5 microseconds.

COMPENSATION FOR STATIONARY METAL

The static signal 269 at the output of analog gated inverter 320 of FIG. 5, is returned to the input of the integrator 250. This signal is an estimate of the amount of metal signal which is to be expected due to furniture, floor reinforcements, etc. This estimate is arrived at by static metal integrator 310. As successive readings accumulate, the signal 269 slowly converges to a value such that, when the integration period of integrator 250 ends, the portion of the integral due to stationary metal is cancelled. Since the metal signal 49 presented to integrator 250 is inverted on alternate pulses, it is also necessary to invert the signal 269, if the signals are to cancel. This periodic inversion is accomplished by sign signal 13 in analog gated inverter 320.

Differential signals from receive coil 38 first pass through resistors 42, 43 (FIG. 10) and are shunted by capacitors 44, 45. These parts form a lowpass filter that removes signals due to radio transmissions and similar sources. Operational amplifier 41 must be a low noise high performance integrated circuit such as an OP 37 from Precision Monolithics. All other operational amplifier ICs (marked OA on drawings) in the system may be a medium-performance low-bias-current device such as the TL071 by Texas Instruments. The preamplifier gain is controlled by resistor 47 and the upper limit of frequency performance is controlled by capacitor 46. The output of the preamplifier 49 is inverted by amplifier 254, so that the signal and its inversion are available as inputs to the analog multiplexer.

Operational amplifier 251 is connected with capacitor 258 to form an integrator. The input node "COM" of the integrator is supplied with current from several sources which may be selected by analog multiplexers 257 and 322, which may be a Siliconix DG508. These multiplexers are under control of the timing system via digital logic level signals 901–904, 13, and 319. The signal 904 enables both multiplexers 257 and 322. Signals 901, 902, and 903 together are a binary word for selecting whether the common point "COM" is connected to one of the resistors 252 . . . 256, or to the output 269, or to open-circuited inputs. Prior to acquisition of a sample, the integrator is reset by enabling a signal path between the terminals of capacitor 258, via multiplexer 257. When it is time to begin integration, the integrator is connected via 257 to one of four resistors 252, 253, 255, or 256. These resistors control the gain, or weighting, of the integration process. The smaller the resistor, the larger the weighting. Resistors 252 and 253, connected directly to the preamplifier, supply noninverted signals. These inputs have "positive" weight. The signals supplied via resistors 255 and 256 are derived from inverted signals; they have "negative" weight. Under control of signals 901 . . . 904 the weighting of the integration may be changed in less than a microsecond.

The static metal signal from prior samples is expected to be unchanged for the next sample. This signal arrives at the integrator 251 via 269 from analog gated inverter 320 of FIG. 10. The expected static metal signal 319 is first inverted by operational amplifier 321 and the direct and inverted inputs presented as inputs to multiplexer 322, either of which may be selected by the state of control line 13. If line 904 is negated then none of the above inputs is enabled. The integrator 251 holds the value at 59, which was present when line 904 was negated. Following integration at 251, the value at 59 is held while processing continues.

HUM REMOVAL

The next processing step is hum removal. An analog multiplexer 261 of FIG. 11, such as a DG508, connects the output of the integrator at 59 to the free end of one of seven capacitors in capacitor array 262. Each capacitor holds a voltage equal to the value at 59, which was taken seven cycles previously.

The voltage at common connection 265 is the input to buffer 7. It is equal to the difference between the voltage currently presented at the integrator output 59 and the integrator output voltage presented by the integrator exactly one power line cycle (seven sample periods) earlier. If the hum pickup level is steady in phase and amplitude, then the hum component of the new sample will equal the prior component held in the appropriate capacitor of 262. The difference will be zero so that the steady hum component is cancelled. On the other hand, since the potential contraband metal signal is linearly proportional to the excitation current, and this has been reversed for the present sample relative to the one whose value was stored in the capacitor, that signal appears doubled in amplitude at point 265, and at buffered output 69.

The signal amplitude is symmetrically limited by silicon signal diodes 263, such as 1N4148, as illustrated in FIG. 3B. Buffer amplifier output 69 is processed by demodulator 270 of FIG. 5. Upon completion of the system cycle, a solid state transmission gate 264 of FIG. 11, which may be a Siliconix DG211, is enabled, grounding point 265. This stores the value at 59 until the next time this particular capacitor 262 is selected. The voltage thus stored will be subtracted from a new sample value at 59 seven observation cycles later, just as the value stored seven cycles prior to this one was subtracted from this value.

This hum removal is closely related to a discrete-sampled comb-notch filter; however, the addition of transmission gate 264 (FIG. 11) at the filter output 265 yields a finite impulse response, i.e. a response which dies away very rapidly. This finite response helps isolate transient noise pulses and so minimize their effects.

That signal which remains is due chiefly to metal passing through the detector, plus noise from small random sources, plus high and low level transients, as shown in FIG. 3B.

BIAS FREE LIMITING

The next step in the signal processing is to minimize the effect of transients. McNae (Geophysics, Vol. 49 number 7, page 934–948) describes methods of dealing with interference in geomagnetic exploration, where many of the problems are similar to those encountered by metal detectors. In a technique he calls "pruning" he rejects data, or ensembles of data, which may reasonably be identified as containing noise transients. He points out that this method is superior to simple limiting, since high frequency cyclic signals or short transients can be aliased by limiting processes into different frequency regions, even to the point of looking like changes in the value of the property one is attempting to measure. The consequences of such aliasing can seriously bias the average outcome of a series of measurements.

McNae could have gone on to state that the reason such biases occur is that the transient may be superimposed on a large amplitude, consistent signal due to interference or leakage of the excitation signal into the receiver. Transient clipping effectively modulates the envelope of such a signal. As the leakage signal becomes larger, so does the intermodulation effect. Data biasing may be minimized by removing as much as possible of any consistent signal input, using linear signal processing, before limiting is performed. This invention removes or strips two major interference components, hum and static metal. When this interference stripping has been done, signal clipping or limiting may be performed without introducing much signal bias.

In the technology of metal detectors, this interference stripping has important consequences. Removal of hum and static metal signals has reduced the dynamic range which is necessary to represent the signal at 265 of FIG. 11, by around 50 dB. Transient interference is exposed as occasional noise signals which are much larger than the normal signals at this point. (FIG. 3B )

The signal at input 265 of amplifier 7 (FIG. 11) represents only the difference of two samples of data, so limiting at this early point in the signal processing will corrupt only two data values.

Limiting, represented by crossed diodes 263, may also be obtained by other suitable electronic means, arranged to yield a response which is proportional to the input up to a certain level, and constant thereafter.

DEMODULATION

Figure 12:
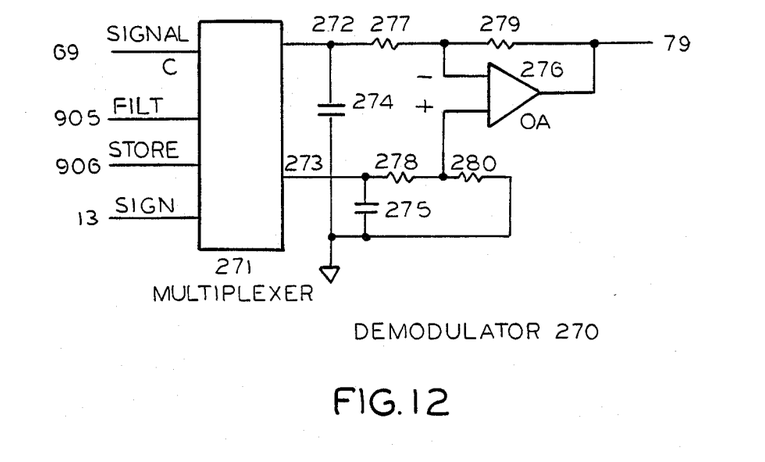
FIG. 12 is a block diagram which shows a demodulator for signals in the inventive system.
Figure 13:
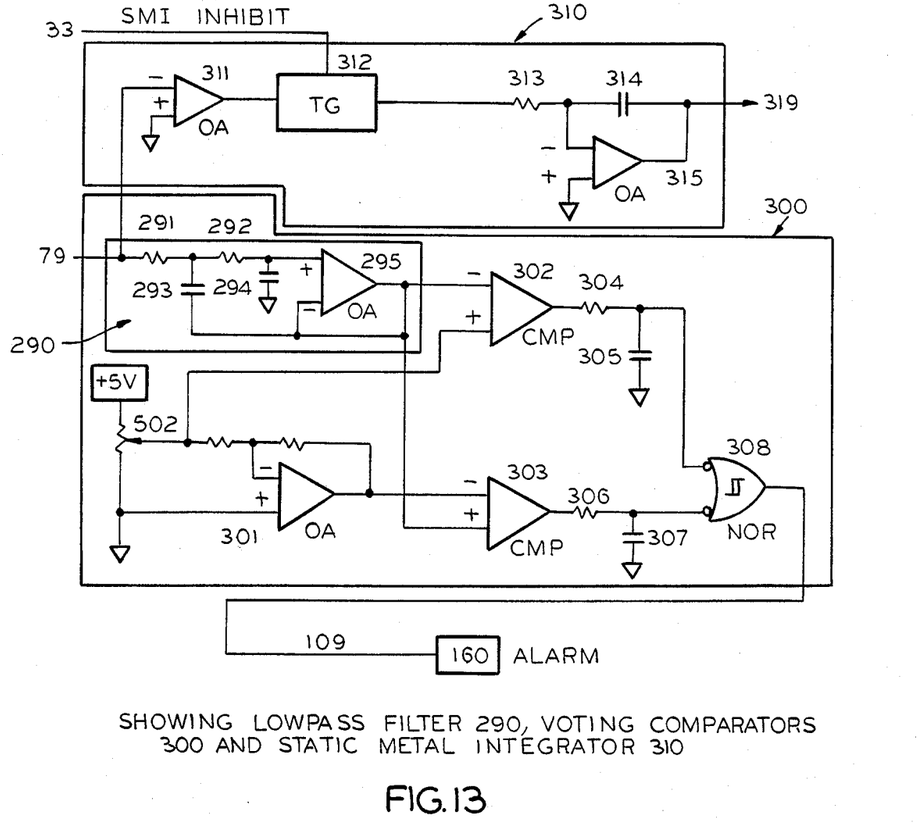
FIG. 13 is a block diagram which shows a lowpass filter, the majority-voting method, and the integrating means for removal of static metal signals.

The signal at point 265 of FIG. 11 then passes through a buffer amplifier 7 and is demodulated (FIG. 12). Under control of the "sign" signal 13 and timing signals 905 and 906, signal 69 is alternately steered via multiplexer 271, which may be a DG508, to holding capacitors 274 and 275 at the inputs of an operational amplifier 276 connected as a linear differential amplifier. Since the signals on capacitors 274 and 275 are amplified with equal gain, but in an opposite sense by amplifier 276, this steering synchronously demodulates the receiver signal, completing the process of double inversion which was begun by inverting the excitation signal.

After transferring the signal at point 69 to one of the holding capacitors 274 or 275 of FIG. 12, the next step is to save the integrator output voltage for the next power cycle. This process was mentioned above in the discussion of the hum filter.

FILTERING

The demodulated signal 79 at the output of the differential amplifier is now lowpass filtered by operational amplifier circuit 295 of FIG. 13. The lowpass performance of the filter is determined by resistors 291, 292 and capacitors 293 and 294. Filtering at this point is necessary in order to improve the rejection of low-amplitude transients and random noise. In a digital implementation, an equivalent procedure is to take the sum of 14 or 28 successive samples (two or four cycles of the mains).

VOTING

The relatively clean signal from the lowpass filter is now ready for processing by the alarm sensing comparators (FIG. 13.) There are two alarm comparators 302, 303, which may be parts such as LM339 by National Semiconductor. One comparator 302 is for positive voltage excursions and the other comparator 303 is for negative excursions. A low level at the output of either comparator represents the potential presence of a contraband object. The threshold reference voltage may be provided by manually adjusted potentiometer 502. An inverter 301 provides an equal negative threshold voltage, so that voltage excursions in either direction will result in an alarm condition.

One final constraint is placed on the signal before a threshold crossing is reported as an alarm. A simple lowpass filter following each comparator requires that the threshold crossing be consistent. Such a filter may be constructed of a resistor 304 and capacitor 305.

The process that results is best seen as analogous to democratic voting. Each independent time increment (approximately 3 milliseconds due to the lowpass filter 295) is allocated a single "vote" from comparator 302 or 303. The output of this comparator may be high or low ("nay" or "yea" respectively) on the question of issuing an alarm. This output does not depend on the degree to which the threshold has been exceeded at the inputs of the comparators (in the case of a "yea" vote). The values of filter 304, 305, or filter 306, 307 which determine the time constants of the post comparison filters may be adjusted to include more or fewer votes in the election (two out of four or eight out of sixteen, for example). The threshold "majority", the number of "yea" votes required to issue an alarm (such as four out of nine or seven out of nine), may be adjusted by adding a bias current at the comparator outputs. A setting that yields two out of four votes appears to be about right. The majority is sensed at either input of logic gate 308, which may be a CD 4093 by RCA.

The same objectives could be achieved by connecting the outputs of the two comparators together into a single filter. In this case, however, a brief oscillatory transient could result in a false alarm. The signal level might at first rise higher than the positive threshold of comparator 302, then go lower than the negative threshold of comparator 303. The filter would see several "yea" votes in rapid succession, and an alarm would be issued. In the circuit of FIG. 13, each filter would see "yea" votes less than half the time, and an alarm would not occur.

The "alarm" output 109 of NOR gate 308 may be applied to any suitable annunciator or actuator, or may be used to disable an access mechanism.

DERIVATION OF THE STATIC METAL COMPENSATION SIGNAL

The static metal signal mentioned above must be generated dynamically. Changes due to thermal drift, aging, rearrangement of furniture and similar effects change the metal signal. These changes can be much larger than the signal from a small contraband object, and thus can cause false alarms. In the invention, the metal signal is amplified by operational amplifier 311 of FIG. 13 and applied through a transmission gate 312 to an integrator comprising resistor 313, capacitor 314, and amplifier 315. The product of resistance 313 and capacitance 314 is on the order of a minute, so the rate of change of the integrator's output voltage is very slow. If it reacted too quickly, signals from slowly moving objects would be nullified by inclusion of their signals in the static metal signal. If this happened, the object would not be detected. In spite of the slow rate of integration, an equilibrium state will eventually be attained for signals from objects that are truly stationary. Equilibrium occurs when enough static metal compensation is developed that the voltage at the input of amplifier 311 averages to zero.

DYNAMIC SUBTRACTION OF SIGNALS FROM METAL DOORS

Metal detectors must frequently be used in conjunction with heavy metal doors in security areas. Because the doors are so massive, they may result in a changing metal signal that triggers false alarms, even though the doors do not open into the volume where the detector is most sensitive. The most straight forward approach, if feasible, is to move the metal detector further from the door. If this is not possible, the door may be made of some non-conductive material, such as glass, wood, or plastic.

The invention accommodates moving doors another way. In the microprocessor implementation (FIG. 6), the position of the door 31 is monitored by a transducer 32, connected to the hinge of the door. During a learning phase, a table is created in the memory of the control processor, defining changes in the metal signal as a function of door position. Later, when the system is operating normally, the position of the door is monitored. As the door position changes, the metal signal corresponding to the door at that position is subtracted from the measured signal. As a result, the signal from a nearby metal door is cancelled at each position of the door. The door does not interfere with the detector. There are many ways to measure a door's position. One means uses a digital encoder attached to the door's hinge. Another employs an analog potentiometer attached to the hinge, followed by an analog to digital converter 230. The position sensor 32 need not be linear, but it must be monotonic (steadily increase as the door is opened) and repeatable.

Figure 6:
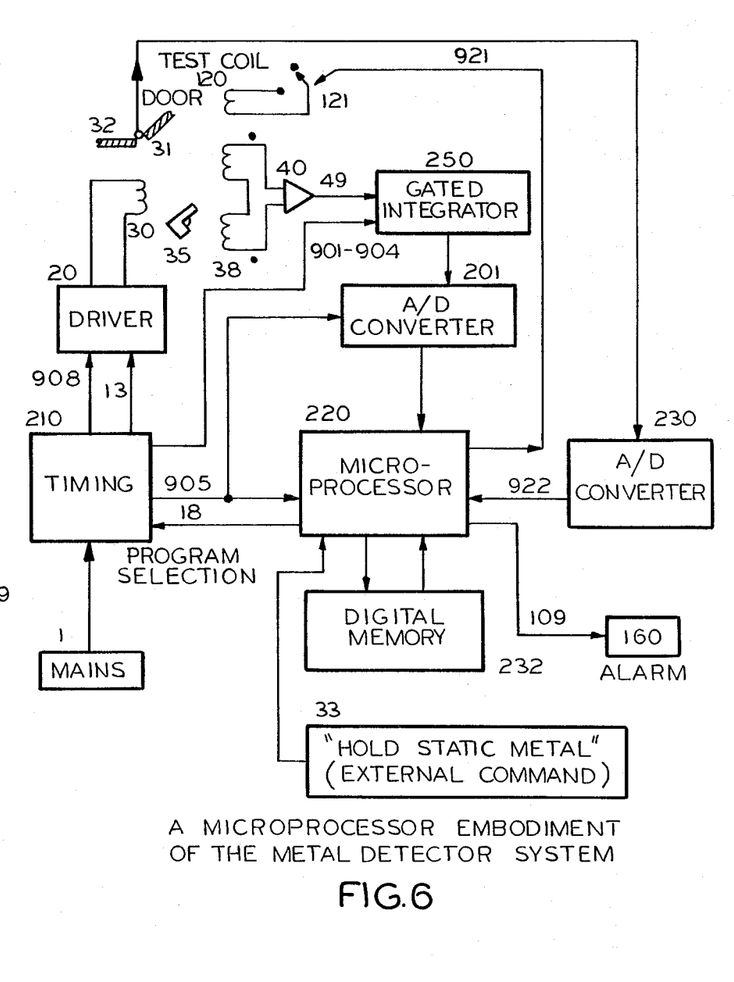
FIG. 6 is a block diagram of an embodiment of the invention using a microprocessor.

Cancelling signals from a moving metal object, for example a door, proceeds as follows:

1. The metal object 31, such as a door, of FIG. 6 is supplied with a means 32 for monitoring its position. Such means may be an electronic potentiometer or shaft encoder attached to the hinge of a door, or an optical sensor tracking a portion of the object, or a magnetic Hall effect sensor.

2. This means is coupled via appropriate cabling and input electronics to a microprocessor, which is supplied with a program memory containing instructions and a data memory which may be used to store information. The microprocessor also controls the metal detector. The door position at any time is made available to the microprocessor as an input. The remaining portion of the compensation is mediated by the microprocessor operating upon electronically coded information in the microprocessor's memory, as follows:

3. The user signals to the microprocessor 220, via pushbutton or keyboard, that the processor is to "learn" the properties of the door. The processor begins operation of a special process as follows:

4. The user causes the door 31 to swing through its entire normal trajectory. As this is done, the following steps 5 through 8 are repeated cyclically about ten times per second.

5. The processor continuously monitors the position of the door. At each position of the door, the processor causes that position to be converted to a binary coded number that uniquely corresponds to that particular position. If the measuring means is an electronic potentiometer, the conversion means may be an analog-to-digital converter integrated circuit such as an ADC 0808 by National Semiconductor.

6. The position number is added to a constant value in order to form an address pointer, i.e. a number that specifies a location of certain data in the processor's memory.

7. The signal from the metal detector integrator 250 is converted into a digital representation, by an analog-to-digital converter integrated circuit 201 such as an ADC 1210 by National Semiconductor. The converted signals are processed in a digital signal processing algorithm equivalent to analog processing by circuits 260 and 270 of FIG. 5, and 290 of FIG. 13. The resulting digital value is the equivalent of a direct measurement at the output of filter 290.

8. The metal signal measured at step 7 is stored in the memory location derived in step 6.

9. As the door swings, different address pointers are derived in step 6, and different measured metal values are stored in each address as in step 8. As a consequence, a table in microprocessor's data memory is constructed defining the metal signal to be expected at each door position. After the door has completed its full trajectory, the table will have been initialized.

10. The user indicates to the processor that it is to enter its normal operating mode. The microprocessor does so.

11. In normal operation the door position and metal signal are measured and converted as in steps 5 and 6 above.

12. The table entry at the address computed during step 6 above is digitally subtracted from the newly measured metal signal.

13. The difference obtained in step 12 is the signal from possible contraband metal. It may be processed digitally to emulate the performance of the voting comparator circuits of FIG. 13.

INHIBITING STATIC METAL COMPENSATION

Under some circumstances it may be desirable to inhibit "static metal" adaptation. Examples of times when adaptation should be inhibited would be when a predictable noise transient is occurring, or when a large metal object is passing, or when the user needs to detect an extremely slow moving or stationary object. For these applications a transmission gate 312 (FIG. 13) is included between the amplifier 311 and the static metal integrator at 315. The decision concerning when to disable the integrator is made by some external device, such as a switch, keyed to the event. When the inhibiting event is observed, the integration may be stopped by asserting line 33, SMI INHIBIT. This inhibits integration via transmission gate 312. The integral stored in capacitor 314 will be held for a time limited only by the internal leakage of the integrator circuit.

SELF TEST DEVICE

Figure 14:
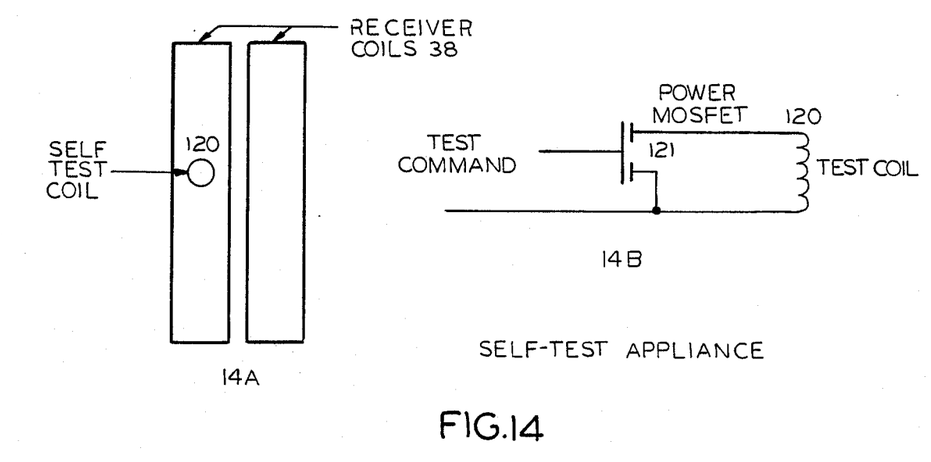
FIG. 14 shows a test appliance.

Component value drift or noncatastrophic failure may alter the sensitivity of the metal detector without necessarily causing immediately observable symptoms. Such changes must be promptly detected, since failure to do so could have expensive or perhaps even deadly consequences. There is no substitute for human vigilance, but the invention incorporates an important backup device. With this device, most sensitivity changes will be promptly detected FIG. 14 depicts the test fixture, having a self-test coil 120, with 200 tightly bundled turns of 28 Gauge wire on a 10 Cm diameter coil. This coil is attached to a switch such as a power MOSFET 121 such as IRF610 by Motorola. When the MOSFET is biased into a low-resistance state, the coil, having been shorted by the MOSFET, will behave magnetically about the same as a copper ring of the same diameter, weight, and placement. It will induce strong signals in receive coils if it is nested into one side of the receiver coil array 38, as shown in FIG. 10.

If the MOSFET is switched into the OFF state, no current can circulate in the coil. In effect the simulated copper ring "disappears" as far as the metal detector is concerned. By alternately switching the MOSFET on and off and measuring the difference in the demodulated metal signal at the output of operational amplifier 215 of FIG. 13, or the equivalent value in digital memory 232 of FIG. 6 in the case of a microprocessor, the metal detector can calibrate its entire signal path, from excitation driver 20 of FIG. 5, through coil integrity (30, 38), through cable attachments, preamplifier 40, and all the way through to the alarm. If the difference at this point is too large or too small, as compared to preset limits, the system may warn the user of a malfunction. In the case of a microprocessor implementation, this is a matter of writing a software subprogram, stored in the microprocessor's digital memory 232 of FIG. 6, to execute the test, evaluate the results and issue appropriate signals.

A hand-held sensitivity probe may also be used. In this case the MOSFET switch is driven with a 1 Hz square wave from a digital multivibrator.

HIGH DISCRIMINATION INTEGRAL

A special integration protocol at integrator 250 of FIG. 5 and 6 permits detection of small steel firearms without false-alarming on typical pocket clutter. A very simple integration, beginning at the instant when the field starts to collapse and ideally extending to infinity, will yield a null result for an ohmically conductive object. On the other hand, the integral will not be zero if the object has high magnetic permeability or is superconductive. In the case of a conductive permeable object, the conductivity will be ignored and only the permeability will be sensed. For the purposes of this discussion, "permeable" will be used to mean that an object is able to pass low level magnetic flux at least 20% more easily than empty space. Examples of permeable materials are iron, most steels, magnetic ferrites, and certain rare earth metals. Copper, brass, aluminum, gold, living matter, magnetic recording media, and fabric are not permeable materials for our purposes.

All commercially produced firearms known to the inventor, including the Glock "plastic" pistol, incorporate a large amount of permeable material, mostly steel. On the other hand, "pocket clutter", such as keys and coins, or belt buckles and jewelry, seldom contain much permeable material. The new technique, differentiates between the signals from innocent metal and those from potential threats.

The following describes the special integration protocol.

Consider the metal detector coils of FIG. 5. During excitation, coil 30 is driven at constant current by a driver 20 with high voltage compliance. Driver coil 30 and receive coil 38 are constructed to minimize mutual coupling between the coils. A change of current in coil 30 will then induce a minimal voltage transient in 38. The total absence of mutual coupling is not necessary for successful operation, but the coupling must be small enough so that the preamplifier 40 and the integrator 250 can accommodate the entire signal amplitude induced in the receive coils 38, without distortion.

The coupling between the coils is modulated by the presence of a conductive or magnetically permeable object 35, such as a pistol, that distorts the field of coil 30, either temporarily or permanently. If such an object is present, then a change of current in coil 30 will induce a transient voltage in coil 38. When amplified, the signal from coil 38 may be used to indicate the presence of the object. The method of processing the signal is such that only permeability is detected, to the exclusion of conductive "eddy current" responses.

When the current is first applied to transmit coil 30 of FIG. 5, eddy currents are induced in conductive object 35, but these currents eventually reduce to zero because of ohmic losses in object 35. After the currents in object 35 reduce to zero, the current output of the driver 20 is dropped to zero. The exact time dependence of this current transient will not affect the operation of the inventive system. For explanatory purposes, the current in coil 30 will be assumed to drop at a constant linear rate until it reaches zero, as in FIG. 15A.

Figure 15:
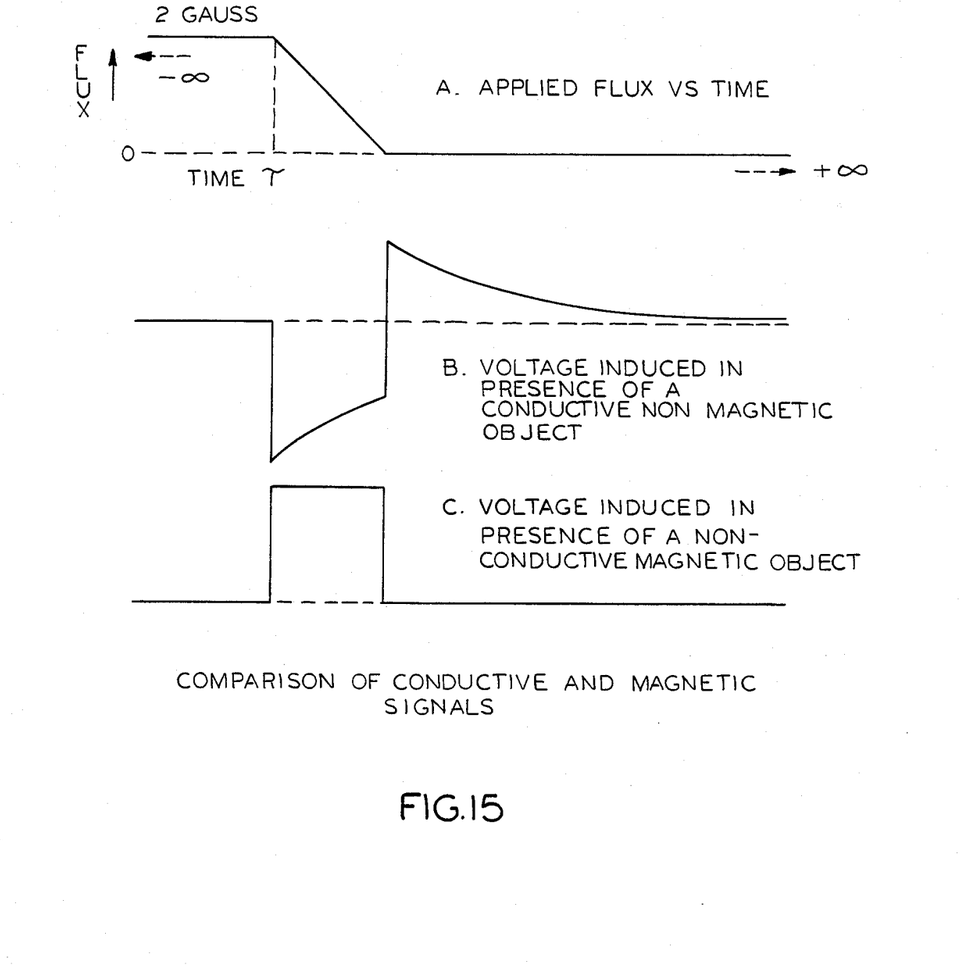
FIG. 15 is a comparison of the conductive and magnetic signals.

If object 35 of FIG. 5 is conductive, then the voltage versus time, induced in receive coil 38, has the appearance of the plot of FIG. 15B. Initially, the field change is opposed by the conductor, blocking a portion of the field change. The initial transient representing this blockage is drawn as a negative voltage. However, as time goes on, the eddy currents that initially blocked the change will decay exponentially, causing a positive transient voltage. The integral of this waveform, integrated from the instant of field collapse in driver coil 30 to plus infinity, is zero and is shown in FIG. 15B.

For a nonconductive but high permeability object, the collapse of the field of transmit coil 30 is locally amplified by the collapse of the induced magnetization of object 35. The result (FIG. 15C) is a unipolar pulse in receive coil 38 which is proportional to the size and permeability of object 35. The time integral of this response is distinctly nonzero. It so happens that all metals presently used for making gun barrels, including stainless steel guns, are magnetically permeable, so this property of permeability is a good indicator of the presence of a gun.

The time integral of voltage induced in coil 38 is proportional to the net flux change in the coil. In particular, the change in the integral, due to the presence of an object, is proportional to the change in the net flux in the coil, due to the presence of the object. A conductive object such as aluminum or silver, having a permeability that matches free space, does not affect the field either before or long after the collapse of the field from coil 30. The time integral of voltage induced by this object will be zero, regardless of the detailed shape, magnitude or time constant of the response. On the other hand, because a permeable object or superconductor will distort the static applied field prior to the collapse, and in particular distort it differently following the collapse, the above integral will not be zero. It may be used as an indicator of the presence of a magnetically permeable object.

Small steel objects such as a North American Arms .22 Cal stainless steel minirevolver are detected by the above protocol, while large nonmagnetic conductive objects such as aluminum drink cans or decorative silver belt buckles are ignored.

Of course, it is impractical to use infinite time periods for excitation or integration. One millisecond periods for excitation and integration are adequate to allow the contrast or discrimination between the response to typical non-permeable objects, such as belt buckles, bracelets, and the response to permeable objects, such as large or small guns. By doubling the sensitivity ("weighting") of the integrator during the last third of the integration interval, it is possible to compensate for the truncation of the interval. With weighted integration, satisfactory discrimination is obtained using excitation and observation periods as short as 400 microseconds each.

Suitable encoding of Read Only Memory 16 of FIG. 8 can provide timing control of amplifier 41 outputs through resistors 252, 253, 255 and 256 of FIG. 10 to achieve the discrimination previously described. The timing control appears as 901, 902 and 903 of FIG. 10.

ALTERNATIVE IMPLEMENTATIONS OF THE PERMEABILITY DETECTION PROTOCOL

1. A measurement cycle may be used in which the field drive sense is cyclically reversed rather than gated on and off. The preamplifier output passes through an analog gated inverter which inverts its sense synchronously with the sense of the field drive. The gated inverter output may then be processed by a lowpass filter to extract the signal.

2. The time necessary to reduce eddy currents to zero in the object 35 and the integration period may be reduced by applying a field whose value quickly reaches a maximum and then tapers to a slightly smaller value towards the end of the excitation interval. A short excitation can be compensated by increasing the weighting of the integration as a function of time since the end of the excitation.

3. A superconductor may be regarded as an object with a permeability of zero (as compared with unity for free space or nonferrous metal, and several hundred for most steels.) The signal from a superconductor, acquired under this protocol, is therefore analogous to that from a steel object but reversed in sign. The means and process described above are therefore directly useful, without change, as a laboratory tool to assay for superconductive materials. The size and shape of the coils 30 and 38 may be changed as appropriate to accommodate the samples to be assayed.

The claimed invention is:

1. A pulsed-field metal detector system comprising a transmitting coil for transmitting pulses and a receive coil for receiving signals derived from said transmitted pulses, means for driving the transmitting coil responsive to current pulses recurring in cyclically alternating polarity, timing means coupled to synchronize measurement cycles at an odd half-multiple of an AC power main frequency, means for amplifying received signals derived from said transmitting pulses, means for subtracting from the amplified signals those components of said received signals which are due to periodic noise signals and static metal, means responsive to the subtracting means for limiting the absolute amplitude of residual signals remaining after said subtraction, means for demodulating and averaging the residual signals, means for detecting excursions of the averaged signal above or below preset threshold values, and means responsive to detection of said signals beyond said preset threshold values for giving an alarm when said threshold is exceeded for a majority of several successive process intervals.

2. The system of claim 1 and a pair of threshold detector means, one of said pair responding to positive excursions beyond said threshold value and the other of said pair responding to negative excursions beyond said threshold value, and means for giving an alarm in response to threshold crossings exceeding either one of the pair of threshold detectors for a prescribed duty factor, over a prescribed period of time.

3. The system of claim 2 and microprocessor means for performing all signal processing.

4. The system of claim 1 and means for integrating said received pulses over a predetermined period of time, and means for fixing the duration of the integration interval in order to capture an integer number of cycles of periodic noise, in order to minimize such noise.

5. The system of claim 4 and microprocessor means for performing all signal processing.

6. The system of claim 1 wherein said subtracting means comprises means for injecting into the received signals a signal having an integral substantially equal and opposite to the integral of signals caused by the static metal objects, thereby cancelling the signal caused by said static metal objects.

7. The system of claim 6 and microprocessor means for performing all signal processing.

8. The system of claim 1 in which signals produced responsive to power-line hum and its harmonics have a signal value of a corresponding phase point in a previous power-line cycle, where the signal produced from power-line hum and its harmonics is cancelled at the integrator output by subtracting the signal level at the corresponding phase point in a previous power-line cycle, with the receiving means now signal-inverted to cause subtractive cancellation of power-line components in the result.

9. The system of claim 8 and microprocessor means for performing all signal processing.

10. The system of claim 1 and means for digitizing said residual signal, means responsive to said digitized residual signal for digitally processing said residual signal by a predetermined algorithm, means for processing signals due to motion of illuminated metal parts at positions, and with signal responses as a function of the position of said parts, which are known in advance, so as to substantially extract and eliminate extraneous signals due to the predictable movement of illuminated metal.

11. The system of claim 10 and microprocessor means for performing all signal processing.

12. The system of claim 1 and means for detecting regularly occurring offset signals which occur in response to predictable sources, means for removing said regular offset signals from the incoming data samples to reduce the dynamic range requirements of subsequent processing circuitry, and means after said removal of said offset signals for signal averaging and lowpass filtering.

13. The system of claim 12 in which said offset signal removal means is followed by a circuit which limits transient signal amplitudes prior to signal averaging.

14. The system of claim 1 and means for adjusting stimulus and integration timing so that the detector is responsive to the permeability but not to conductivity of an object in the fields of said transmitting and receiving coils.

15. The system of claim 1 and microprocessor means for performing all signal processing.

16. The system of claim 1 having a detector coil array and microprocessor means for performing a self-test using a fixed coil in the detector array.

17. A measurement process comprising the steps of applying a nominally steady magnetic excitation field for a minimum of 300 microseconds, then removing the field and immediately beginning an integration of signals beginning at the instant when the applied field begins to collapse and continuing thereafter for 300 microseconds, with the added step of increasing the integrator sensitivity late in an integration period in order to compensate for the shortness of an interval during which measurements are taken.

* * * * *